Inventor
PICKARD F. BARGH
By Jacob Frank
Attorney

By

United States Patent Office 3,522,437

Patented Aug. 4, 1970

3,522,437

READING APPARATUS FOR TWO OR MORE DIFFERENT SIZE TYPE FONTS

Pickard F. Bargh, Fairfax County, Va., assignor to Farrington Electronics Inc., Springfield, Va., a corporation of Massachusetts Filed Dec. 3, 1964, Ser. No. 415,581

Int. Cl. G06k 9/00

U.S. Cl. 250—219 10 Claims

ABSTRACT OF THE DISCLOSURE

A high speed scanning device provides the capability of optically reading two or more type fonts on a single machine, where the fonts vary in size by as much as two to one and the reading rate is to be no less than for a single font. The scanner causes the character image to be projected onto a rotating disc containing a number of radial slits, through these moving slits onto a set of fixed slits, and through these to a set of photocells. The disc contains alternating long and short radial slits, and there are four fixed slits. Of the latter, two are long and are positioned so as to intersect the longer radial slits only. The other two are short and intersect every radial slit. When using the long slits, the height of the reading field is roughly twice that obtained with the short slits. These are used for reading the larger fonts. The shorter slits are used when reading smaller fonts, and since every radial slit is used, better horizontal resolution is achieved. The vertical resolution is the same for both fields. The recognition circuitry is adjustable for the different timings of the signals respectively corresponding to the different set of alternate slits.

The present invention relates in general to high speed scanning devices for scanning a field such as a character bearing document or the like in progressive lines of scan, and more particularly to rotary disk scanning units for use with high speed automatic character sensing equipment.

The present invention is particularly applicable to the field of automatic character sensing, and the ensuing description will be particularly applied to that field. Automatic character sensing equipment as employed in this field may briefly be described as apparatus which scans intelligence-bearing documents or the like containing items of information such as printed characters, senses the present and/or absence of bits of each character thereon in reference to a time and/or positional base and relation and produce signals indicative of the presence and absence of such bits of characters within the scanning field, interprets the signals thus produced to identify the character sensed, and produces an output at some desired time indicative of the character read. Examples of such apparatus are disclosed in U.S. Pat. No. 2,663,758 granted Dec. 22, 1953 to David H. Sheppard, U.S. Pat. No. 2,897,481 granted July 28, 1959 to David H. Sheppard, and U.S. Pat. No. 2,978,590 granted Apr. 4, 1961 to David H. Sheppard.

Briefly, the present invention provides the ability, by novel methods and apparatus, to read two or more type fonts on a single machine where the type fonts vary in size by as much as two to one or more, and to increase the reading rate for one size of type font without changing magnification ratios in the scanner and without changing the speed of the rotary disk scanning unit.

An object of the present invention is the provision of novel methods and apparatus for scanning successive areas of character-bearing documents and the like at high speed to produce multiple signals indicative of the presence or absence of portions of such character along prearranged lines of scan for use in connection with automatic character sensing and like functions.

Another object of the present invention is the provision of novel methods and apparatus for use with automatic characters sensing equipment and the like for scanning different sizes of type font at different reading rates.

Another object of the present invention is the provision of novel methods and apparatus for use with automatic character sensing equipment and the like for scanning different sizes of type font at different reading rates inversely related to the size of type font, without changing magnification ratios in the scanner and without changing the speed of the rotary disk scanning unit.

Another object of the present invention is the provision of novel methods and apparatus for use with automatic character sensing equipment and the like, which novel methods and apparatus are characterized by simplicity of construction.

Other objects, advantages and capabilities of the present invention will become apparent from the following detailed description, taken in conjunction with the accompanying drawing, showing one preferred embodiment of the invention.

Figure 1:
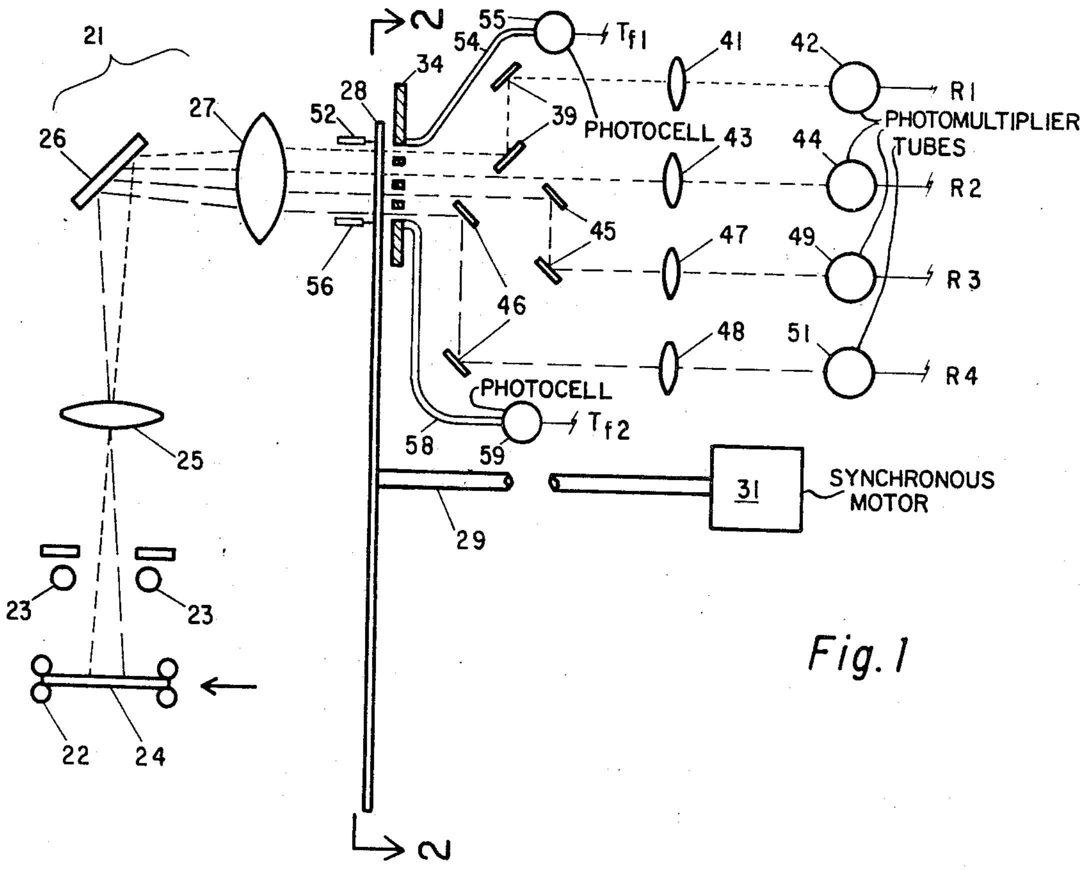
FIG. 1 is an optical schematic diagram of the optical scanning components of one form of scanning apparatus in which the present invention may be used.

Referring to the drawings wherein like reference characters designate corresponding parts throughout the several figures, the scanning assembly, generally indicated by the reference character 21, is directly mounted over feed track 22 of suitable automatic document feed mechanism so that the optical center axis of the scanning unit 21 is perpendicular to the plane of the feed track with the optical center axis lying in the center of the scan zone from which information is to be read. The reading area is brightly illuminated by a pair of prefocused lamps 23.

Figure 2:
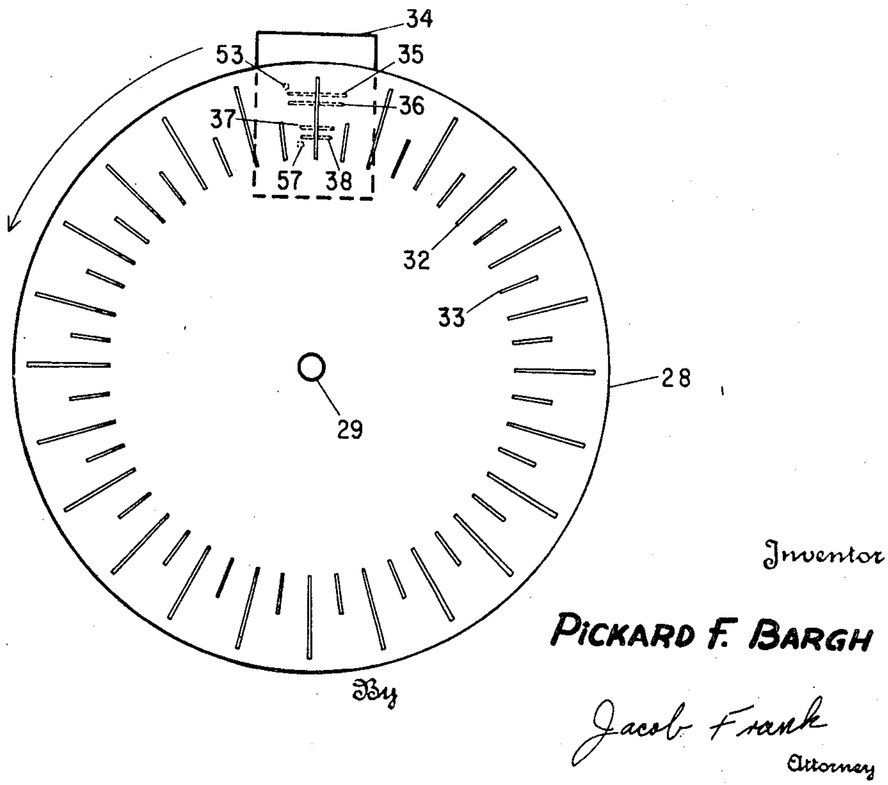
FIG. 2 is an elevational view of the scanning disk in the scanning unit illustrated in FIG. 1, viewed from the line 2—2 of FIG. 1.

Light reflected from the document, indicated generally at 24, is focused by a focusing lens 25, and is bent through an angle of ninety degrees by a first surface mirror 26, thence through a correcting lens 27 to focus the image of the document on the plane of the scanning disk 28. The scanning disk is provided with a central shaft 29 rigidly affixed thereto which shaft is supported for rotation in suitable fixed bearings. Shaft 29 is driven at high speed by a synchronous motor 31 interconnected with the shaft 29 in any conventional manner. As illustrated in FIG. 2, the scanning disk 28 is provided with a first group of equally spaced radial slits 32, and a second group of equally spaced yet smaller radial slits 33, all of said radial slits being disposed near the periphery of disk 28. Each of the smaler radial slits 33 is positioned intermediate a pair of the radial slits 32, and the inner end portions of radial slits 33 are located at the same distance from the center of shaft 29 as are the inner end portions of radial slits 33.

In a preferred embodiment, the scanning disk is a 7.5 inch diameter aluminum disk containing twenty 0.008 inch wide radial slits 32 spaced at equal intervals of approximately 18 degrees, and twenty .008 inch wide radial slits 33 similarly spaced at equal intervals of approximately 18 degrees, whereas the length of each of the radial slits 32 is substantially .400 inch and the length of each of the radial slits 33 is approximately 0.20 inch. A fixed plate 34 is located in the path of the image focused by correcting lens 27 and positioned adjacent the rear side of the scanning disk 28. Fixed plate 34 is provided with a first pair of horizontal slits 35, 36, and a second yet shorter pair of horizontal slits 37, 38, whereby the fixed horizontal slits 35, 36 are slightly reduced in length relative to the spacing between successive radial slits 32 of the scanning disk, and the shorter horizontal slits 37, 38 are slightly reduced in length relative to the spacing between successive radial slits 32 and 33. In a preferred embodiment the horizontal slits 35, 36 are 0.672 inch long and 0.651 inch long respectively, .006 inch wide, and are spaced center to center 0.010 inch apart vertically, while the shorter horizontal slits 37, 38 are 0.298 inch long and 0.285 inch long respectively, .006 inch wide, and are spaced center to center 0.010 inch apart vertically. It is noted that the determination of the fixed relative lengths of the horizontal slits 35, 36 and 37, 38 is a variable depending upon the spacing of the alternate size radial slits to be employed in the scanning disk and the variety of sizes of type font to be read on the printed documents 24.

The positioning of the fixed horizontal slits 35, 36 and 37, 38 in relation to the radial slits 32, 33 of scanning disk 28 is unique, in that as the scanning disk is rotated the slices of a reflected image from the document will be projected through the fixed horizontal slits 37, 38 via successive radial slits 32 and 33, whereas slices of the reflected image from the document projected through fixed horizontal slits 35, 36 will only pass by way of successive radial slits 32. Furthermore, it is apparent from the relative lengths of each pair of the fixed horizontal slits, that horizontal slits 35, 36 are capable of projecting information from the scanning of a reading field which has a height of roughly twice that obtainable by projecting information from the shorter fixed horizontal slits 37, 38. Therefore, the longer fixed horizontal slits 35, 36 are employed for reading relatively larger type fonts and the shorter fixed horizontal slits 37, 38 are employed for reading relatively smaller type fonts.

The light beam transmitted by fixed horizontal slit 36 is directed through an optical loop 43 to the photocathode of a photomultiplier tube 44, whereas the light beam transmitted by the uppermost fixed horizontal slit 35 is bent laterally into a parallel path with the transmitted beam by a pair of mirrors 39, thence transmitted through an optical loop 41 to the photocathode of a photomultiplier tube 42. In a similar manner, the light beam transmitted by each of the lowermost fixed slits 37, 38 is bent laterally into a parallel path with the transmitted beam of light by mirror pairs 45 and 46 respectively, thence transmitted through mutual optical loops 47 and 48 to the photocathode of respective photomultiplier tubes 49 and 51. For convenience, the signals derived from photomultiplier tubes 42, 44, 49 and 51 are designated as recognition signals $R_1$, $R_2$, $R_3$, and $R_4$, respectively.

Figure 3:
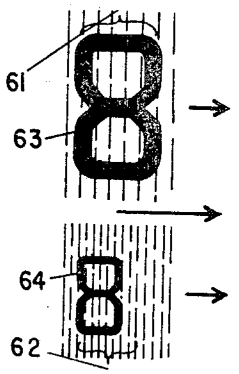
FIG. 3 illustrates, by way of example, the manner in which the increased scan rate is employed with characters of varying sizes.

The scanning disk 28 in this preferred embodiment is rotated at a rate of 15,000 revolutions per minute thereby providing 5,000 scans per second as a scan repetition rate via fixed horizontal slits 35, 36, and 10,000 scans per second as a scan repetition rate via fixed horizontal slits 37, 38 since these latter horizontal slits will intersect reflected image portions from twice the number of radial slits as will fixed horizontal slits 35, 36 due to the unique relative positioning of the fixed and radial slits, as heretofore disclosed. Thus, for smaller characters to be read, the horizontal resolution (accounting for the number of vertical slices of the character image being read) will increase by a factor of two as illustrated in FIG. 3, where 61 denotes the vertical scan lines scanning a large character 63 activated by employing only radial slits 32 in conjunction with fixed horizontal slits 35, 36, and further, where 62 designates the vertical scan lines scanning a smaller character 64 activated by utilizing radial slits 32 and 33 in conjunction with fixed horizontal slits 37, 38, thus improving the recognition capabilities of the scanning logic used to detect the presence and/or absence of specific characters being read. It will be appreciated that the number of different lengths of radial slits in conjunction with the number of different lengths of fixed horizontal slits may be varied, dependent upon the variety of sizes of font types to be read and the horizontal resolution desired for the various sizes. Furthermore, it is noted that the radial slits and fixed horizontal slits could take other forms or configurations, such as of a curved or spiral nature which could be comprised of a number of small apertures rather than a continuous slit.

Provision is also made in the scanning unit for providing timing signals, designated $T_{F1}$ and $T_{F2}$, which signals respectively identify the end of each scanning frame depending upon which pair of fixed horizontal slits 35, 36, or 37, 38 are being employed for recognition of the characters on documents 24. For this purpose exciter lamp 52 is mounted in front of the scanning disk 28 by suitable means, to be in registration with both the path of the radial slits 32 of scanning disk 28 and aperture 53 of the fixed plate 34, for allowing a narrow beam of light emitted from the exciter lamp 52 to pass through a slit 32 and aperture 53 when in alignment with each other. Light from aperture 53 is transmitted by way of light guide 54 to a photocell 55 for exciting the same to cause a current flow, thereby generating a timing signal $T_{F1}$ each time one of the radial scanning disk slits 32 passes between exciter lamp 52 and aperture 53. Similarly, by utilizing an exciter lamp 56, mounted in front of the scanning disk 28 by suitable means, to be in registration with the path of the radial slits 32 and 33 of scanning disk 28, and aperture 57 of the fixed plate 34, a narrow beam of light emitted from exciter lamp 56 will pass through slits 32 or 33 and aperture 57 when in alignment with each other. Light from aperture 57 is transmitted by way of light guide 58 to a photocell 59 for exciting the same to cause a current flow, thereby generating a timing signal $T_{F2}$ each time one of the radial scanning disk slits 32 or 33 passes between exciter lamp 56 and aperture 57. Aperture 53 is located on fixed plate 34 at such a position so as to cause the $T_{F1}$ pulse to be produced just before each radial slit 32 leaves the fixed horizontal slits 35, 36. In the same manner, aperture 57 is located on fixed plate 34 at such a position so as to cause the $T_{F2}$ pulse to be produced just before each radial slit 32 and 33 leaves the smaller fixed horizontal slits 37, 38.

Figure 4:
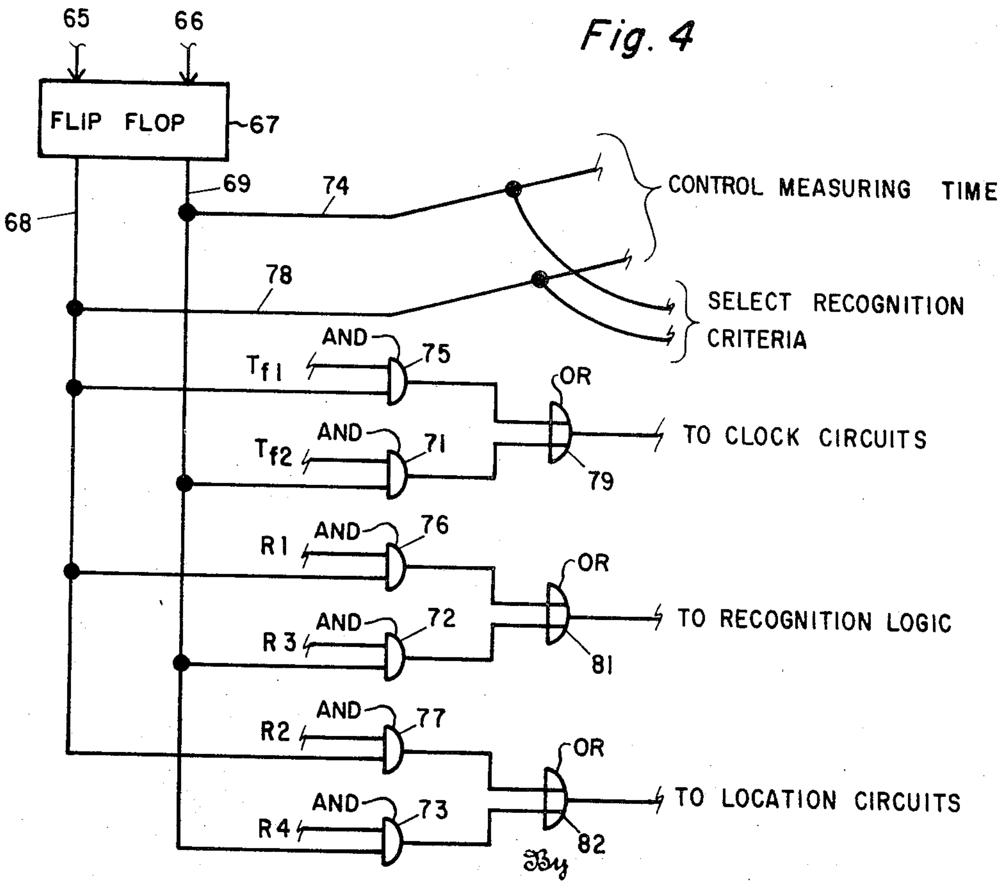
FIG. 4 represents a detailed schematic block diagram of the circuitry employed in the present invention.

FIG. 4 illustrates a schematic block diagram of the electrical changeover unit of the present invention, wherein signals are presented at terminals 65 and 66 of the bistable flip-flop unit 67, respectively denoting signals representative of ready to read larger type font characters, and ready to read smaller font type characters. Signals may be actuated at terminals 65 and 66 by either manual or electronic means. The lead line output 69 is coupled to each AND gate 71, 72 and 73, and additionally to lead wire 74, whereas lead line output 68 is connected to AND gates 75, 76 and 77 and additionally to lead wire 78. Timing signals $T_{F1}$ and $T_{F2}$ are coupled to mutual AND gates 75 and 71, while recognition signals $R_1$, $R_3$, $R_2$, and $R_4$ are connected to their respective AND gates 76, 72, 77, and 73. The output of AND gates 75 and 71 are coupled to OR gate 79 which output is fed to conventional clock circuits employed in optical character recognition systems for establishing time references to aid the recognition logic. AND gates 76 and 72 are connected to OR gate 81 which output is fed to introduce the signal representative of the character being scanned to the recognition logic. The output of AND gates 77 and 73 are coupled to OR gate 82 which output is fed to conventional location logic circuitry for automatic registration of the characters as they are being read (see the magazine, Electronics, Jan. 5, 1962). Assuming that the smaller type font being scanned has different characteristics than the larger type font or vice versa, then lead wires 78 and 74 are selectively activated to select the specific set of recognition criteria for the corresponding type font being scanned. Lead wires 74 and 78 are additionally utilized to control the conventional measuring time constants set within the recognition logic circuitry, which measuring time constants are employed to detect the continuity of selected features or patterns in a character for a predetermined period of time, whereby the measuring time constant would be decreased accordingly for smaller type fonts.

In the operation of the unit, light from the illuminating lamps 23 is reflected from the surface of the document 24 as the document passes the reading stage. As the image of the document at the reading stage is focused on the plane of the scanning disk 28 in the path of the radial slits 32 and 33, passage of a radial slit 32 or 33 under the image allows a thin slice of the image to fall upon the fixed slit plate 34. The radial slits and thus the thin slice travels across the image, successively allowing changing portions of the image to fall upon the fixed slit plate 34 as the scanning disk 28 is rotated. The portions of the image slices via radial slit 32 which intersect the two fixed horizontal slits 35, 36 are directed onto the respective photocathodes of photomultipliers 42, 44 and are represented by mutual signals $R_1$, $R_2$, whereas the portions of the image slices via radial slits 32 and 33 which intersect the two smaller fixed slits 37, 38 are directed onto the respective photocathodes of photomultipliers 49, 51 and are representative by mutual signals $R_3$, $R_4$. The direction of scanning is normal to the direction of the image motion due to movement of the document 24 by the document feed mechanism 22. Thus, the scanning unit causes the vertical scanning along a pair of fixed lines while motion of the document causes the scans to progress horizontally with respect to the document.

Prior to the commencement of scanning any one character, group of characters, document or groups of documents, whichever case may be desired, the bistable unit 67 is manually or electronically activated to denote that either small or large type fonts are being or are to be read. Should a large type font be read terminal 66 is activated to create a signal on lead line 68 and thus present an input at AND gates 75, 76, 77, thereby enabling the latter AND gates, when respective signals $T_{F1}$, $R_1$ and $R_2$ occur, to present output signals at mutual OR gates 79, 81 and 82. Since a negation signal is present on lead line 69, bistable units 74 and 78 denote that a large type font is to be read. In the same manner, should a small type font be read terminal 65 is activated to create a signal on lead line 69 and thus present an input at AND gates 71, 72, 73, thereby enabling the latter AND gates, when respective signals $T_{F2}$, $R_3$, and $R_4$ occur, to present output signals at mutual OR gates 79, 81 and 82. At the same time lead wires 74 and 78 are selectively activated to denote that a smaller type font is to be read.

While but one preferred example of the present invention has been particularly shown and described, it is apparent that various modifications may be made therein within the spirit and scope of the invention, and it is desired, therefore, that only such limitations be placed on the invention as are imposed by the prior art and set forth in the appended claims.

What is claimed is:

1. Scanning apparatus for use with automatic character sensing equipment and the like to scan character areas of a character bearing document passing through a reading station through which the document is fed comprising at least a first and second light sensitive members for producing output voltage signals bearing a selected relation to the light intensity to which the respective light sensitive members are exposed, optical means for directing an image of a document area disposed at said reading station toward said light sensitive members, optical stop means interposed between said reading station and said light sensitive members for restricting exposure of said light sensitive members to portions of said image in accordance with a preselected scanning pattern, said stop means including at least first and second parallel stationary slits each arranged in the path of the image, a first group of cyclically movable spaced slits to be swept over the length of each of said first and second stationary slits, a second group of cyclically movably spaced slits to be swept over the length of only said second stationary slit, said first group of moving slits extending transversely across the first stationary slit to be swept over to form scanning apertures at the intercepts of said slits for transmission of registering portions of said image to said first light sensitive means, said first group and second group of moving slits extending transversely across the second stationary slit to be swept over to form scanning apertures at the intercepts of said moving and stationary slits for transmission of registering portions of said image to said second light sensitive means, and means for sweeping said first group of moving slits successively across said first and second stationary slits and for sweeping said second group of moving slits successively across only said second stationary slits.

2. Apparatus as in claim 1 wherein each of said movable slits in said first group is interposed to lie between each pair of said movable slits in said second group.

3. Apparatus as in claim 2 wherein the length of said first stationary slit is slightly less than the distance between adjacent pairs of said first group of moving slits and the length of said second fixed slit is slightly less than the distance between adjacent pairs of said first and second group of movable slits to provide non-transmissive areas between the sweeping of successive moving slits in each of the first and second groups of moving slits for activating the respective light sensitive member to produce short period output reference pulse amplitudes responsive to a standardized light intensity level.

4. Apparatus as in claim 3 including a first opening in said optical stop member adjacent said first stationary slit and underlying the path of said first group of moving slits, and a first exciter lamp and a third light sensitive member for producing output voltage signals mounted in spaced relation in alignment with said first opening lying therebetween to produce a first timing pulse marking coincidence of each of said first group moving slits with the end of said first stationary slit upon registery of each of said first group moving slits with the first opening.

5. Apparatus as in claim 4 including a second opening in said optical stop member adjacent said second stationary slit and underlying the path of said first and second group moving slits, and a second exciter lamp and a fourth light sensitive member for producing output voltage signals mounted in spaced relation in alignment with said second opening lying therebetween to produce a second timing pulse marking coincidence of each of said first and second group moving slits with the end of said second stationary slit upon registering of each of said first and second group moving slits with the second opening.

6. Apparatus as in claim 5 including electrical circuitry controls for connecting to the conventional logic circuitry employed in automatic character sensing equipment a group of reference signals being necessary for the interpretation of those output voltage signals developed in the first and second light sensitive members respectively.

7. Scanning apparatus for use with automatic character sensing equipment and the like to scan character areas of a character bearing document passing through a reading station through which the document is fed comprising at least first and second light sensitive members for producing output voltage signals bearing a selected relation to the light intensity to which the respective light sensitive members are exposed, optical means for directing an image of a document area disposed at said reading station toward said light sensitive members to condition said light sensitive members in accordance with the light intensity at said reading station, optical stop means interposed between said reading station and said light sensitive members in intercepting relation to the image for restricting exposure of said light sensitive members to portions of said image in accordance with a preselected scanning pattern, said stop means including at least first and second parallel stationary slits each arranged in the path of the image in parallelism with a selected transverse axis of the image, a first group of cyclically movable equally spaced slits to be swept over the length of said first stationary slit along the axis thereof, with said first group of moving slits extending transversely across said first stationary slit to form scanning apertures at the intercepts of said slits for transmission of registering portions of said image to said first light sensitive member, a second group of cyclically movable slits and said first group of cyclically movable slits all being equally spaced and to be swept over the length of said second stationary slit along the axis thereof with said first and second group of moving slits each extending transversely across said second stationary slit to form scanning apertures at the intercepts of said moving and stationary slits for transmission of registering portions of said image to said second light sensitive member, and means for sweeping said first group of moving slits successively across said first and second stationary slits and for sweeping said second group of moving slits successively across only said second stationary slit.

8. Apparatus as in claim 6 including electrical circuitry controls for connecting to the conventional logic circuitry employed in automatic character sensing equipment a group of reference signals being necessary for the interpretation of those output voltage signals developed in the first and seocnd light sensitive members respectively.

9. Apparatus for scanning two or more different size type fonts on a character bearing document passing through a reading station by a character recognition machine, said apparatus causing an increase in the scanning rate for relatively smaller type fonts while maintaining a singular speed for a rotary disk scanning unit, said apparatus comprising means for scanning the image of a first area on the document, means for simultaneously scanning the image of a second area on the document and the image of a third area on the document lying within said second area, said image of the third area being equal to and substantially coextensive with the image of the first area, means for guiding selected image portions successively scanned from the image of said first and third areas to a first light sensitive device, means for guiding selected image portions successively scanned from the image of said second area to a second light sensitive device, means for developing output voltage signals bearing a selected relation to the light intensity to which the respective light sensitive devices are exposed, and means for selectively transmitting the output voltage signals from only one of said light sensitive devices dependent upon the relative size of type font being scanned for character recognition purposes.

10. Apparatus for scanning two or more different size type fonts on a character bearing document passing through a reading station by a character recognition machine, said apparatus increasing the reading rate for relatively smaller type fonts exclusive of any mechanical changeover, said apparatus comprising means for simultaneously scanning an image of a first area and a second area lying within said first area on the document, means for directing image portions scanned from the first area to a first light sensitive device, means for directing image portions scanned from a section of the first area and image portions scanned from the second area to a second light sensitive device, and means for selectively transmitting the output voltage signals developed in one of the light sensitive devices to character recognition logic depending upon the relative size of the type font being scanned.

References Cited

UNITED STATES PATENTS

| | | | |
|---|---|---|---|
| 2,943,208 | 6/1960 | Shepard et al. | 250—219 |
| 3,205,367 | 9/1965 | Whitesell | 250—219 |

ARCHIE R. BORCHELT, Primary Examiner

M. ABRAMSON, Assistant Examiner

U.S. Cl. X.R.

340—146.3